US007333805B2

(12) United States Patent
Oestreich

(10) Patent No.: US 7,333,805 B2
(45) Date of Patent: Feb. 19, 2008

(54) METHOD FOR MONITORING THE TRANSMISSION QUALITY IN A CELLULAR RADIO COMMUNICATION SYSTEM

(75) Inventor: Stefan Oestreich, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 692 days.

(21) Appl. No.: 10/239,217

(22) PCT Filed: Mar. 16, 2001

(86) PCT No.: PCT/DE01/01005

§ 371 (c)(1),
(2), (4) Date: Sep. 20, 2002

(87) PCT Pub. No.: WO01/72056

PCT Pub. Date: Sep. 27, 2001

(65) Prior Publication Data

US 2003/0060192 A1    Mar. 27, 2003

(30) Foreign Application Priority Data

Mar. 20, 2000 (DE) .............................. 100 13 798

(51) Int. Cl.
*H04Q 7/20* (2006.01)
*H04B 7/216* (2006.01)
(52) U.S. Cl. .................... 455/423; 455/452.1; 370/335
(58) Field of Classification Search ............. 455/452.1, 455/423, 452.2, 424, 524, 425, 419, 517, 455/67.13, 562.1, 703, 560, 561, 557, 69, 455/67.3; 375/219, 222; 704/222; 370/335, 370/342, 468, 252, 465, 328, 466; 714/6
See application file for complete search history.

(56) References Cited

U.S. PATENT DOCUMENTS

| 4,924,480 | A | * | 5/1990 | Gay et al. ..................... 375/222 |
| 5,513,211 | A | * | 4/1996 | Yabusaki et al. ........... 375/219 |
| 5,751,935 | A | * | 5/1998 | Kojima et al. .................. 716/6 |
| 5,839,077 | A | * | 11/1998 | Kowaguchi ................. 455/517 |
| 5,991,642 | A | * | 11/1999 | Watanabe et al. ........... 455/560 |
| 6,108,560 | A | * | 8/2000 | Navaro et al. .............. 455/517 |
| 6,256,487 | B1 | * | 7/2001 | Bruhn ........................ 455/352 |
| 6,349,204 | B1 | * | 2/2002 | Goetz et al. ................ 455/419 |
| 6,405,020 | B1 | | 6/2002 | Oestreich et al. .......... 455/67.3 |

(Continued)

FOREIGN PATENT DOCUMENTS

DE         197 421 24 A1    9/1997

(Continued)

OTHER PUBLICATIONS

ETSI EN 301 709 V.7.0.2 Digital Cellular Telecommunications System (Phase 2+); Link Adaptation (GSM 05.09 version 7.0.2 Release 1998), Dec. 1999, pp. 1-13.

(Continued)

*Primary Examiner*—Jean Gelin
*Assistant Examiner*—Kiet Doan
(74) *Attorney, Agent, or Firm*—Staas & Halsey LLP

(57) ABSTRACT

In a cellular radio communication system that supports in each of its cells a plurality of different codec modes for the purpose of radio transmission, the terminals working in a cell and a base station of the cell refer to the information relating to the use of codec modes as CM information. The extent of use of the individual codec modes is registered by filtering the pieces of CM information from the data traffic of the cell and collecting them in a memory in cell-related statistics.

18 Claims, 3 Drawing Sheets

U.S. PATENT DOCUMENTS

| | | | |
|---|---|---|---|
| 6,421,527 B1* | 7/2002 | DeMartin et al. | 455/67.13 |
| 6,445,697 B1* | 9/2002 | Fenton | 370/357 |
| 6,452,941 B1* | 9/2002 | Bruhn | 370/468 |
| 6,542,484 B1* | 4/2003 | Ovesjo et al. | 370/335 |
| 6,594,248 B1* | 7/2003 | Karna et al. | 455/352 |
| 6,604,070 B1* | 8/2003 | Gao et al. | 704/222 |
| 6,639,906 B1* | 10/2003 | Levin | 370/342 |
| 6,697,642 B1* | 2/2004 | Thomas | 455/562.1 |
| 6,700,881 B1* | 3/2004 | Kong et al. | 370/335 |
| 6,775,558 B1* | 8/2004 | Ranta et al. | 455/557 |
| 6,879,599 B1* | 4/2005 | Galyas et al. | 370/466 |
| 2001/0043577 A1* | 11/2001 | Barany et al | 370/328 |
| 2002/0114284 A1* | 8/2002 | Kronestedt et al. | 370/252 |
| 2002/0181495 A1* | 12/2002 | Requena et al. | 370/465 |

FOREIGN PATENT DOCUMENTS

| | | |
|---|---|---|
| EP | 964 540 | 12/1999 |
| WO | 99/60742 | 11/1999 |
| WO | 00/31996 | 6/2000 |

OTHER PUBLICATIONS

ETSI EN 301 704 V7.2.1 Digital Cellular Telecommunications System (Phase 2+); Adaptive Multi-Rate (AMR) speech transcoding (GSM 06.90 version 7.2.1 Release 1998), Apr. 2000, pp. 1-58.

ETSI EN 301 703 V7.0.2 Digital Cellular Telecommunications System (Phase 2+); Adaptive Multi-Rate (AMR) speech processing functions; General description (GSM 06.71 version 7.0.2 Release 1998), Dec. 1999, pp. 1-12.

* cited by examiner

METHOD FOR MONITORING THE TRANSMISSION QUALITY IN A CELLULAR RADIO COMMUNICATION SYSTEM

CROSS REFERENCE TO RELATED APPLICATION

This application is based on and hereby claims priority to German Application No. 100 13 798.9 filed on Mar. 20, 2000, the contents of which are hereby incorporated by reference.

BACKGROUND OF THE INVENTION

1. Field of the Invention

The present invention relates to a method for monitoring the transmission quality in a cellular radio communication system which supports plural signal coding and decoding methods, hereinafter termed codec modes, for radio transmission in each cell.

2. Description of the Related Art

In radio communication systems, items of information such as, for example, speech, picture information or other use data are transmitted by electromagnetic waves over a radio interface between a transmitting and a receiving radio station, such as for example a base station or a mobile station in the case of a mobile radio system. The transmitting and the receiving station each have an encoder/decoder, termed codec for short, which serves to convert, for example, a binary coded digital data stream to be transmitted into a coding which is suitable for radio transmission, or to convert back a data stream received by radio into its original coding.

The information transmission takes place here in so-called frames, i.e., all data are combined within a frame duration of, e.g., 20 ms, and are coded/decoded in common.

Numerous signal coding and decoding methods, or codec modes, are known, which are respectively optimized for different transmission conditions on the radio path between transmitter and receiver.

Because of the mobility of the subscribers, the transmission quality on the radio path in mobile communication systems can vary markedly over short periods. The use of different codec modes makes possible satisfactory speech communication even under these variable conditions. Different codec modes use different methods for the data compression and data reduction which convert a speech signal into a digitized data stream with respectively different data rates. After the radio transmission, the digitized data stream is converted back again in to a speech signal at the receiver. The higher the data rate of the digitized stream, obviously the better the accuracy with which the original signal can be reproduced at the receiver. It would therefore be basically desirable to be able to transmit the digitized speech signal at as high a rate as possible.

The data rate which can be transmitted on a conventional radio communication network is of course insufficient for speech transmission with high fidelity in real time. In known GSM mobile radio systems, this data rate is, e.g., 22.8 kb/s per channel. The problem arises there that the radio transmission of data, particularly in mobile radio networks, is error-prone, since the transmission conditions between transmitter and receiver are very variable due to the mobility of the subscriber, and it frequently happens that a data radio signal radiated from a transmitter reaches the receiver over several paths of different length, so that the signal received by the receiver is composed of several components which have an a priori unknown time and phase offset from one another.

In order to be able to transmit an intelligible speech signal under these conditions, it is necessary to transmit in the available channel not only the digitized speech data stream, but furthermore additional information which is generated by the transmitter from the speech data stream and which makes it possible for the receiver to recognize whether data was or was not erroneously received, and if necessary to reconstruct this data. It goes without saying that both the transmission of the speech data stream and also the data transmitted for its reconstruction, termed protective data, is error-prone. Hence the amount of protective data needed in order to be able to satisfactorily reconstruct a given amount of use data is greater, the greater the error rate of the transmission.

Since the total transmission capacity of a channel is limited and is to be always completely used as far as possible, the ratio of speech or general use data to protective data can only be varied by setting the portion of the total bandwidth of the channel available to the use data to be low under poor transmission conditions and high under good transmission conditions. In order to be able to produce the speech data stream with a variable data rate corresponding to the available bandwidth, respectively different data compression and reduction methods or codec modes are used.

The GSM AMR codec is known from GSM Specifications 06.71 and 06.90 for transmitter and receiver of the GSM system, and supports 8 codec modes (CM) for full rate transmission and 6 codec modes for half rate transmission. Each of these modes converts a speech signal into a digitized data stream and is optimized for a given range of transmission quality.

When the transmission quality of the channel changes, the codecs of the transmitter and receiver are changed over to the appropriate codec mode for the present quality. This changeover takes place in that the receiver, when it considers the codec mode used at present not to be optimum, transmits to the transmitter an instruction to change over to another codec mode, designated in the instruction. The AMR codec uses two kinds of such instructions. One includes two bits, which respectively permit specifying one out of four possible codec modes, at a predetermined place of a speech frame. These four modes are termed a codec mode set. The composition of the codec mode set is arbitrary per se and is currently established by the network operators based on experiential values.

The number of codec modes supported by the AMR codec is however greater than four. Therefore not all of the codec modes can be selected in the manner described above. When a change is to be made to a codec mode which does not belong to the present codec mode set, a so-called escape frame (ER), which makes it possible to select another codec mode set, has to be transmitted with this. This escape frame is transmitted instead of a speech frame, and thus leads to a worsening of the speech quality. When the codec mode sets are unfavorably composed, it can happen that frequent changes between two sets frequently have to be made.

It is not immediately possible to determine an optimum composition of the codec mode set which makes it possible to minimize the number of required escape frames. Since the local boundary conditions which determine the transmission quality are respectively different from one cell of a mobile radio network to another, it cannot be concluded, from the fact that a given codec mode set is very suitable for a first cell and a high percentage of codec mode changes which occur in this cell take place within this set, that the same set is also suitable for a neighboring cell. An added difficulty is that the transmission conditions within a cell are not alone determined by the geographical circumstances of the cell. Thus the transmission quality of a terminal device which is situated at a given location of the cell can depend strongly on which time slot is allocated to it, because individual time slots at this location are possibly strongly affected by interference due to a neighboring cell, while others are not. The same holds for the different transmission frequencies used within a cell. Therefore, even within a cell, a codec mode set which is suitable for a first time slot may be found to be unsuitable for a second time slot.

In order to ensure each time a correct decoding at the receiver of the data transmitted by radio, a further two bits are transmitted with each speech frame, and give the codec mode used by the transmitter, in that they specify one of four codec modes of the codec mode set which is valid at any given time.

There are thus two types of codec mode. Information or CM information which is transmitted between terminal devices and the base station in the cells of a radio communication system is of a first type, which informs one partner of a connection of the codec mode used by the other partner, and a second, which informs him which codec mode the first partner wishes to receive from him.

A further problem of conventional cellular radio transmission systems is the lack of an easily operated method which makes it possible to gain exact conclusions concerning the distribution of the transmission quality within geographical partial regions, such as for instance individual cells of the system, and to obtain data concerning the transmission quality respectively related to these partial regions, which data can be consulted as a basis for planning the further extension of the radio communication network or of its cells.

SUMMARY OF THE INVENTION

The invention has an object of providing a method for monitoring the transmission quality in a cellular radio communication system, and a radio communication system suitable for performance of the method, which make it possible to determine in a simple manner transmission quality data which can be consulted as the basis for planning a further extension of the radio communication network, or for determining a codec mode set which is optimally adapted for given transmission conditions.

A further object is to provide a radio communication system which is suitable for performing such a method.

A method according to the invention assumes a radio communication system which supports in each of its cells numerous different codec modes for radio transmission, where the terminal device working in a cell and a base station of this cell exchange between them items of information relating to the use of the codec mode, designated as items of codec mode information or CM information. According to the invention, the extent of the use of the individual codec modes is sensed, in that these items of CM information are filtered from the data traffic of the cell, and statistics are collected relating to a geographical partial region of the radio communication system.

Based on the extent to which the different codec modes are used within the partial region, the quality of the transmission conditions in the partial region can be inferred in a simple manner. Thus, for example, an average for the use of the individual codec modes can be calculated, to make the transmission conditions mutually comparable in the individual partial regions of the radio communication system and in this manner to determine those partial regions which have a conspicuously poor average transmission quality, and hence most urgently require improvement. The extent of the individual codec modes in the partial regions can furthermore be compared with one another. Thus an unusual distribution of the use frequency of the individual codec modes can for example be an indication that there are regions or channels in a partial region which have markedly worse transmission conditions than the partial region on average, and that targeted measures are necessary in order to improve the transmission conditions for these regions or channels.

Particularly when the statistics are to serve as data for the planning of further network expansion, it is appropriate that the statistics for each codec mode determines a magnitude which is representative of the number of transmitted frames using the codec mode concerned. Equally important would be a determination of the transmitted amount of data or elapsed speech time, using the codec mode concerned. A limitation can be made here to filtering from the data traffic of the cells the items of CM information with which a partner of a radio connection, terminal device or base station, indicates the codec mode used by him to the respective other partner.

Where it is a matter of determining the optimum codec mode set for a given cell, the number of frames is of less interest than an item of information concerning how often an instruction to change has been transmitted in a given mode. For this, a limitation can be made to filtering from the data stream the items of CM information which consists of control instructions for determining the codec mode used by the respective other partner.

It is expedient for the geographical region for which the statistics are collected to be identical to the cell.

The statistics are expediently supplied to a central place of the cell, for instance to the base station, at which all radio connections run together to the terminal devices and which is therefore particularly suitable for filtering out from the radio data traffic the instructions for the use of a given codec mode. A further suitable location is the transcoder and rate adapter unit (TRAU), over which passes the whole data traffic of the concerned cells with other cells of the radio communication network or with other networks, or else a base station controller BSC or RNC (radio network controller).

Since uplink and downlink transmission (transmission in the upward or downward direction) between the base station and the terminal devices of the cell in a TDMA radio communication system in general takes place with a respective time displacement, it can occur in a bidirectional connection that the qualities of the uplink and downlink differ, perhaps because one of the two interferes with a radio signal of a neighboring cell radiated in the same cycle, and the other does not. Similar discrepancies can arise when the uplink and downlink are transmitted on different frequencies and one of the frequencies undergoes interference. In order to recognize such effects, it is appropriate if the statistics are supplied separately for uplink and downlink. For the same reason, it can also be advantageous to provide the statistics separately for each transmission frequency or each time slot of the cell.

The control instructions for determining the codec mode to be used can in a known manner include an instruction to select a set of codec modes from among at least two sets and an instruction to determine the codec mode to be used in the currently selected set. In order to improve the efficiency of transmission, the number of instructions for selecting a set of codec modes which must be transmitted is to be as small as possible. This is attained in a simple manner, e.g., in that the composition of the sets is determined based on the statistics such that one of the sets includes the most used codec mode.

Radio communication systems are known in which the data, in the transition from the base station in a fixed network, are not re-coded for transmission to another base station, but the codec mode used by the transmitting terminal device remains unchanged in the fixed network transmission and the data of the base station of a receiving terminal device is radiated using the same codec mode. In this operating mode, known as tandem free operation (TFO), the codec mode used is determined by the weakest link of the transmission chain. In each of the terminal devices taking part in a connection, this means that when a first of these terminal devices transmits an instruction for changing a codec mode due to poor transmission conditions, the reason is in the transmission conditions of the cell of precisely this terminal device. When, however, it receives such an instruction, this can come from the second terminal device or from the base station of the first terminal device. Therefore control instructions, which in the context of tandem free operation are transmitted from the cell of the transmitting terminal device to that of the receiving terminal device, must remain ignored in the statistics of the respective other cell, or be considered separately, since nothing can be said, or nothing with certainty, about the transmission conditions in this other cell. Vice versa, it is however very possible that its own statistic is supplied in a cell regarding the control instructions coming from a foreign cell, in order in this manner to reach a conclusion about the transmission conditions of this foreign cell.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
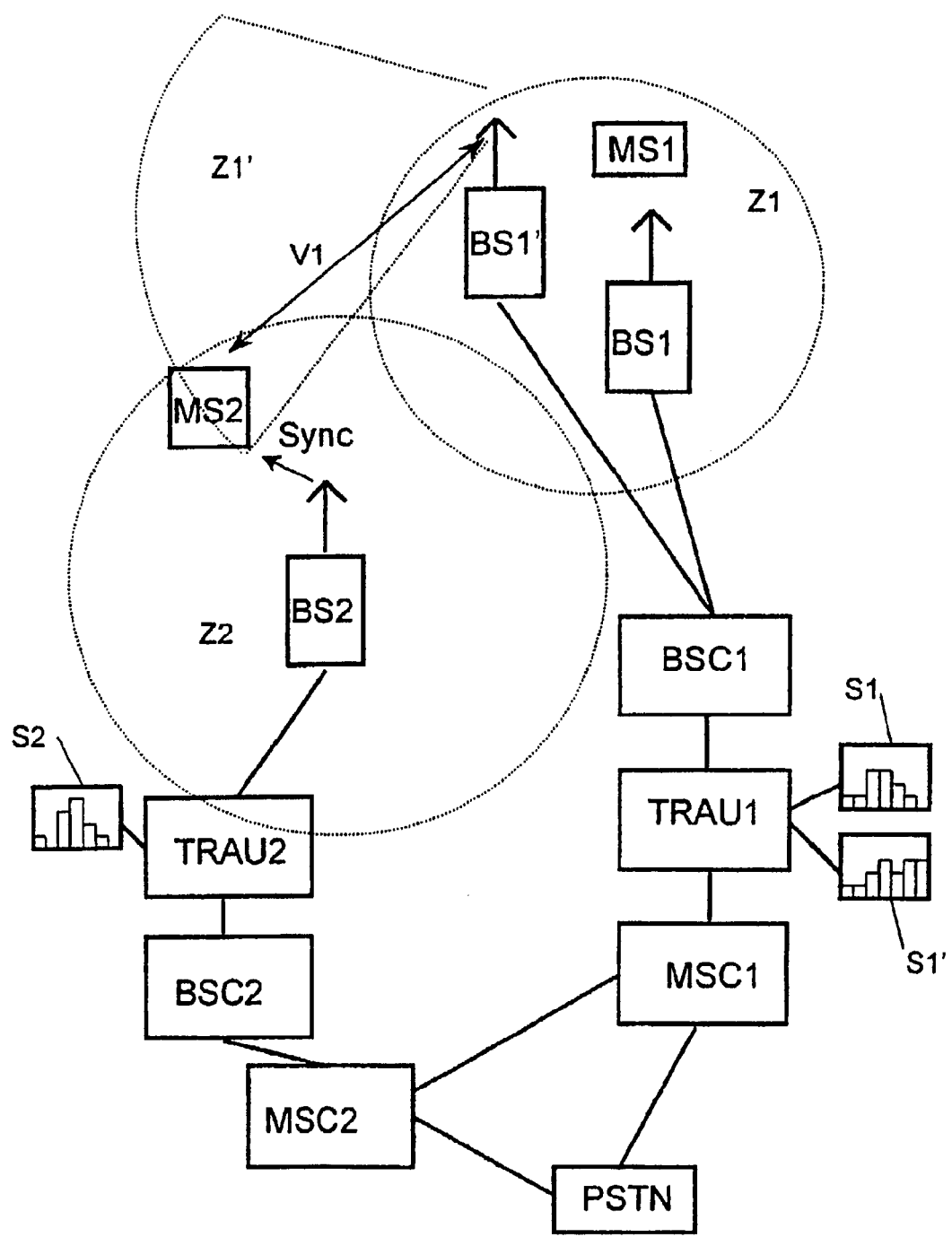
FIG. 1 is a block diagram of a first embodiment of a radio communication system according to the invention.

Reference will now be made in detail to the preferred embodiments of the present invention, examples of which are illustrated in the accompanying drawings, wherein like reference numerals refer to like elements throughout.

The radio communication system according to the invention, shown much schematized in FIG. 1, includes numerous network elements, in particular of mobile switching centers, of which two MSC1, MSC2 are shown in the Figure. The mobile switching centers MSC1, MSC2 are networked together within a radio communication system, and they furthermore respectively have connections to a stationary telecommunication network PSTN, in order to produce connections to subscribers on this stationary network or other mobile radio networks.

The mobile switching centers MSC1, MSC2 are respectively connected to base stations BS1, BS1'1, BS2 by so-called transcoding and rate adaptation units (TRAUs) and also base station controls BSC1, BSC2. The base stations BS1, BS1', BS2 communicate with the mobile stations such as MS1, MS2 situated in their respective cells Z1, Z'1, Z2, using a respective one of plural selectable codec modes, which are optimized for data transmission on the radio path. The task of the TRAUs is to convert this coding into a coding which is optimized for further transmission by wire, and to match the data rates.

The codec mode used for the radio transmission of the data between mobile terminal device and base station is determined in the dialog between mobile terminal device and base station: When one of the two communication partners determines that the quality of the received signal falls below a given boundary value, e.g. by monitoring the bit error rate, it transmits to the other partner a request to use a codec which is better adapted to the transmission conditions than the current one. In the same way, a codec mode adapted to better transmission conditions can be selected when the bit error rate is so low that this appears to be justifiable.

The GSM radio communication system with AMR codec made use of as an example here uses in a known manner eight different full rate codec modes and six half rate modes. The full rate modes are collected into two groups or codec mode sets. In order to change the codec mode within a codec mode set, it is sufficient to transmit 2 bits, which denote the number of the codec mode to be used, within the usual speech transmission frame. A codec mode of the second set cannot be selected in this manner. In order to do this, an escape frame, which contains an instruction to select the second codec mode set, must be inserted instead of a speech frame.

The data of a mobile communication between the terminal devices MS1 and MS2 passes over the base stations BS1, BS2 and the TRAUs 1 and 2, in which a re-coding respectively takes place. The codec modes used for the transmission between terminal device MS1 and BS1 or respectively between BS2 and terminal device MS2 can be different. All of the frames transmitted by the mobile terminal devices of the cell Z1, including possible codec mode selection instructions, thus reach the TRAU1, where they are evaluated and statistically recorded in a memory S1. A memory element is allocated to each codec mode in the memory S1, and its content is incremented each time an instruction to change the codec mode concerned is received. In this manner all the codec mode selection instructions are recorded which originate from the mobile stations. In order to enlarge the statistical basis, it can be provided that each base station also informs its TRAU of those codec mode selection instructions which it itself produces and transmits to one of the mobile terminal devices in its cell.

The codec modes 1-4 and 5-8 are according to the invention combined into two codec mode sets, one set including the most frequently selected modes 1-4. The predominant portion of all code mode changes thus takes place in the set with the codec modes 5-8.

Since the TRAU1 is also connected to the base station BS1' as well as to the base station 1, a second memory S1' is allocated to it in order to record there the codec mode selection instructions exchanged in the data traffic of BS1'.

Figure 2:
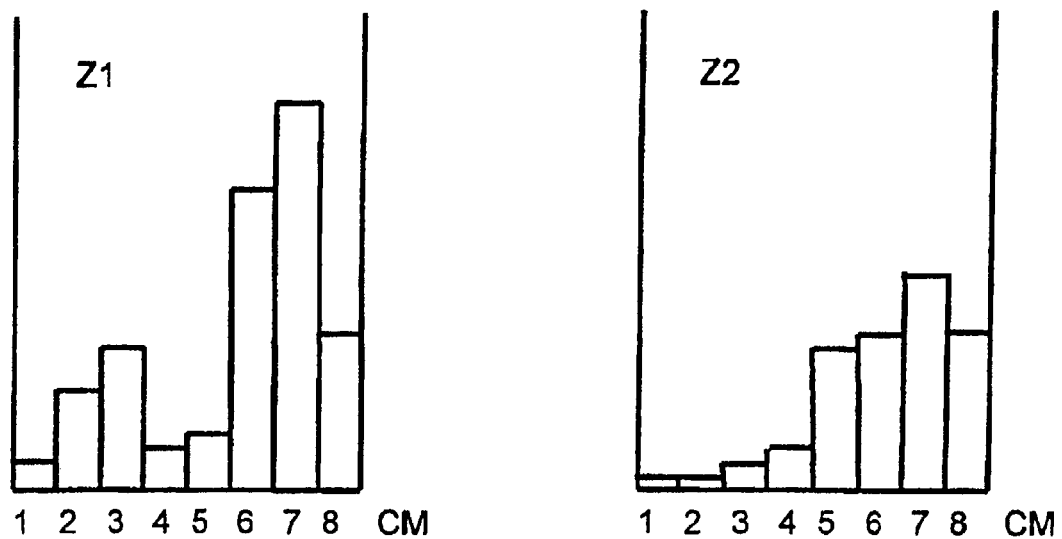
FIGS. 2A and 2B are bar graphs of statistics.

FIG. 2 shows two examples of statistics which were received within the same period for the cells Z1 and Z2 in the memories S1, S2. The codec modes, here numbered 1 through 8, are arranged in order of the transmission quality to which they are adapted. This means that the codec mode 1 corresponds to the worst, and the code 8 to the best, transmission conditions. The height of the individual columns respectively corresponds to the number of received instructions for selection of the codec mode concerned, divided by the total number of the speech minutes spent in the cell. It can be seen that in the cell Z2 the predominant fraction of the selection instructions is concentrated in the codec modes 5-8, while the codec modes 1-4 are only sparsely represented. The reception conditions in the cell Z2 are thus clearly good in general.

The codec modes 1-4 are combined according to the invention in two codec mode sets, one set including the most frequently selected modes 5-8 and the other the seldom selected modes 1-4. The predominant portion of all code mode changes thus takes place in the set with the codec modes 5-8.

Codec mode selection instructions which pass through the TRAU1 coming from the direction of the switching center MSC1, which can occur in TFO, are not included in the statistics, since they are occasioned by the transmission conditions in cell Z2 and say nothing about Z1.

In the statistics of the cell Z1, the columns are on average higher than those of cell Z2, and the codec modes 2 and 3 are relatively frequently selected. This suggests that there must be in cell Z1 a region with relatively poor transmission conditions, and that in order to improve the overall network quality, it could be rewarding to find this zone and optimize its transmission conditions, e.g. by sectorizing the cell Z1 or by arranging a new cell. The overall relatively high numerical values of the individual columns of the statistics of Z1 indicate that the codec mode is frequently changed in this cell, and thus that the transmission conditions probably fluctuate markedly with time or location.

In order to keep the number of codec mode changes in cell Z1 for which it is necessary to transmit an escape frame as small as possible, the composition of the codec mode set is laid down other than in cell Z2: one set contains the frequently selected modes 3, 6, 7, 8, and the other contains the seldom selected modes 1, 2, 4, 5.

In order to evaluate the transmission quality within a cell in comparison with other cells of the mobile radio communication system, an average value can be formed, for example, over the numbers of the codec modes, weighted with the height of their columns in the statistics, collected and compared at a central place for the cells of the system, and those cells which have the worst average value are considered to be in need of improvement. Alternatively, simply for each cell, the portion of a given number of codec modes, respectively optimized for the worst transmission conditions, is determined on the statistics, and a cell is considered to be in need of improvement when this portion exceeds a given threshold value.

Figure 3:
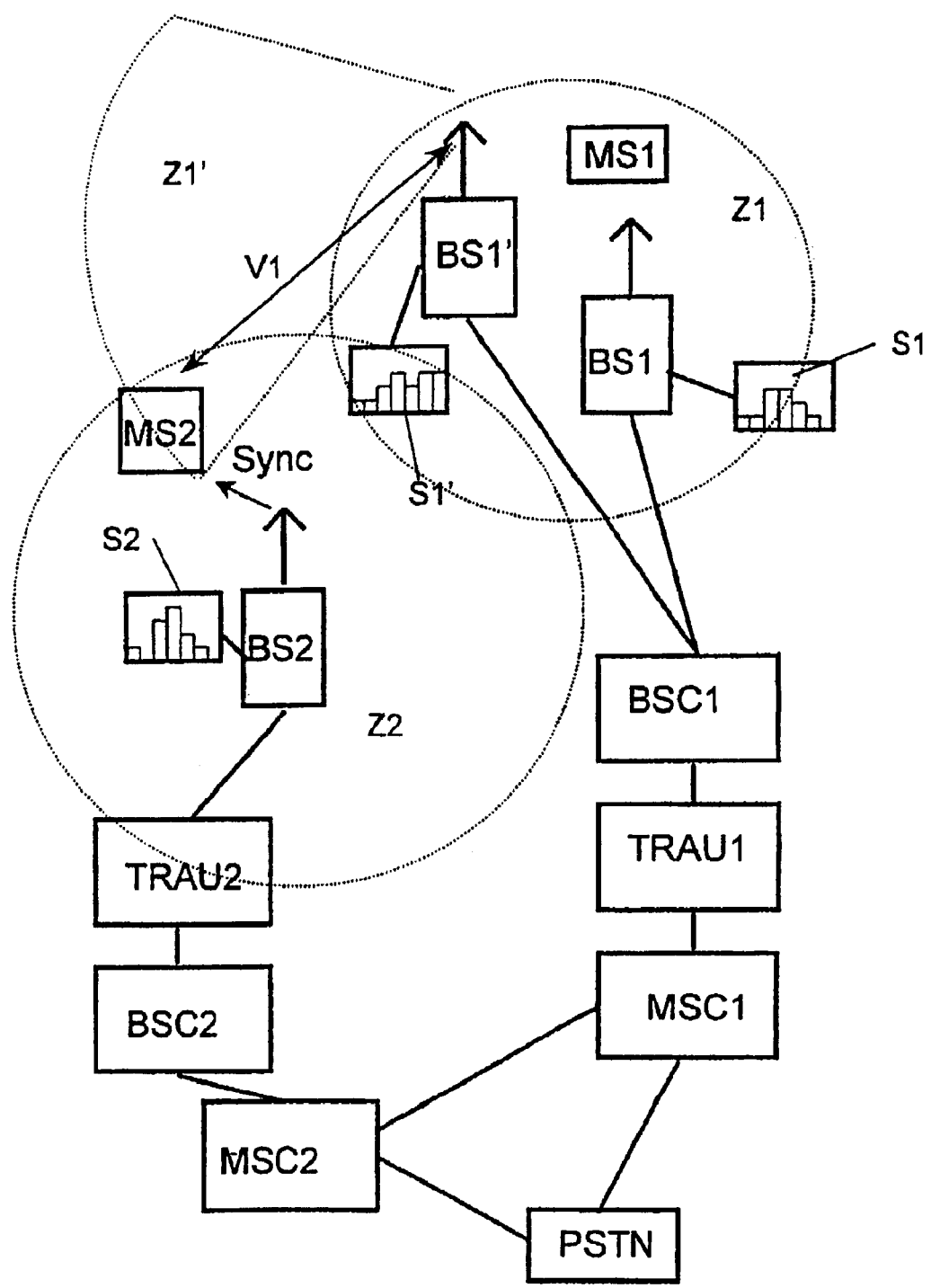
FIG. 3 is a block diagram of a second embodiment of the radio communication system.

The radio communication system shown in FIG. 3 obviously differs from that of FIG. 1 in that the memories S1, S1', S2 for the collection of statistical data regarding codec mode selection instructions are allocated to the base stations and not the TRAUs. The base stations filter the codec mode selection instructions from the radio data traffic between them and the mobile terminal devices in their cell. Because the instructions are filtered out of the radio traffic, it is easily possible to determine, for each individual instruction, in which time slot of the GSM frame and at what frequency it was transmitted, that is, each instruction can be allocated to a given transmission channel of the cell. The statistics are separately supplied in the memories S1, S', S2 according to channels. Memory locations corresponding to the codec modes available for selection exist for each combination of frequency and time slot used in the cell, and each of these memory locations is incremented when an instruction is transmitted for the selection of the corresponding codec mode with the corresponding frequency in the corresponding time slot. Since in duplex operation a transmission channel defined by its frequency and the position of its time slot can be used only for uplink or downlink but not for both at the same time, this determination according to channels likewise contains a separated determination of uplink and downlink.

Figure 4:
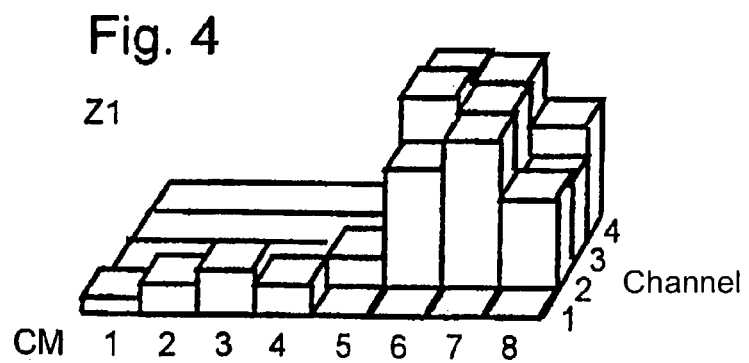
FIG. 4 is a three-dimensional bar graph illustrating an example of statistics collected in a radio communication system according to FIG. 3.

FIG. 4 shows an example of how statistics differentiated according to channel for the cell Z1 could appear under the same conditions as in FIG. 2. For simplification of the diagram, only four channels are considered, differing from the actual conditions in the GSM system.

As can be seen, the transmission conditions on channel 1 are poor overall; practically only the codecs modes 1-4 are used. The three channels 2-4, on the contrary, have better transmission conditions. It can thus be immediately concluded from these detailed statistics that the frequent use of codec modes 2 and 3 already shown in FIG. 2 is to be attributed to the transmission conditions of a single channel and thus to an interference, and not, for instance, to there being in cell Z1 a region which is difficult for the radio signal of the base station BS1 to reach.

In order to minimize the number of escape frames to be transmitted for selection of the codec modes, a codec mode set which contains the most frequently used codec modes is defined for each individual channel. In the case of the channel 1, these are codec modes 1-4; codec modes 5-8 give a second set. Codec modes 5-8 are the most frequently used for channels 2-4, and consequently codec mode sets of the codec modes 5-8 or respectively 1-4 are formed here. Thus in spite of the different transmission conditions of the channels, here the compositions of the codec mode sets are fortuitously equal for all channels of the cell. This result is in contrast to that for the cell Z1 with the codec mode set composition obtained with the simpler statistics according to FIG. 2. In the statistics according to FIG. 2, the codec modes 3, 6, 7 and 8 were combined into one group. It can now be seen from FIG. 4 that this would not have been the optimum solution for a transmission on the channel 1, since substantially for this channel an escape frame would be required with each change from codec mode 3 to one of the others for this channel.

Only such codec modes are considered in the foregoing description which contained full rate codec modes. The invention can of course also be used in the same manner for the control of the use of half rate codec modes. Here individual codec modes can also belong to plural sets. It is also conceivable that mixed codec mode sets are formed which contain both full rate and half rate codec modes.

As a further alternative, instead only the instructions for selecting one of these codec modes can be filtered out from the CM information transmitted in the cell and numerically included in the statistics; also the portion of each codec mode in the communication input of the cell is determined, so that, for instance, the columns of the statistics are incremented each time a frame was transmitted which used the codec mode allocated to the column. For this purpose, that portion of the items of CM information (CM=codec mode) which includes the bits transmitted with each frame and specifying the codec mode valid for this frame can be filtered from the data traffic of the cell.

The invention has been described in detail with particular reference to preferred embodiments thereof and examples, but it will be understood that variations and modifications can be effected within the spirit and scope of the invention.

The invention claimed is:

1. A method for monitoring transmission quality in a cellular radio communication system which supports different codec modes for radio transmission in each cell between a base station of the cell and a terminal device operating in the cell, the codec modes being combined into at least two codec mode sets, and the base station and the terminal device of a connection exchanging items of information concerning use of the codec modes, comprising:
   determining an extent of use of individual codec modes;
   collecting items of information into statistics respectively relating to a geographical partial region of the cellular radio communication system; and
   determining composition of a codec mode set based on the statistics.

2. A method according to claim 1, wherein the items of information transmitted by a first partner of a connection are control instructions for determining the codec mode to be used by the second partner of the connection.

3. A method according to claim 2, wherein the statistics for each codec mode determine a quantity representative of a frequency of transmission of a control instruction for use of the codec mode.

4. A method according to claim 1, wherein the items of information transmitted by a first partner of a connection to the second partner indicate the codec mode used by the first partner.

5. A method according to claim 4, wherein the statistics for each codec mode determine a quantity representative of a number of frames transmitted using the codec mode concerned.

6. A method according to claim 5, wherein the geographical partial region corresponds to a cell.

7. A method according to claim 6, wherein the statistics are supplied to at least one of the base station, a base station control or a transcoder and rate adapter unit of the cell.

8. A method according to claim 7, wherein the statistics are supplied separately for uplink and downlink.

9. A method according to claim 8, wherein the statistics are supplied separately for each transmission frequency of the cell.

10. A method according to claim 8, wherein the statistics are supplied for each time slot of a transmission channel of the cell.

11. A method according to claim 10,
   wherein control instructions for determining the codec mode include an instruction for selection of a current set of codec modes from the at least two codec mode sets and an instruction for determining the codec mode to be used in the current set, and
   wherein the composition of the sets is determined to minimize a number of instructions to be transmitted to select the set of codec modes.

12. A method according to claim 10,
   wherein the control instructions for determining the codec mode include an instruction for selection of a current set of codec modes from the at least two codec mode sets and an instruction to determine the codec mode to be used in the current set, and
   wherein the composition of the sets is determined such that one of the sets includes a most used codec mode.

13. A method according to claim 10, wherein items of information transmitted in tandem free operation between two terminal devices of different geographical partial regions remain ignored in the statistics.

14. A method according to claim 13, wherein, of items of codec mode information transmitted in tandem free operation between two terminal devices of first and second geographical partial regions, the statistics relating to the first geographical partial region only rely on the items whose use is occasioned by transmission conditions in the first geographical partial region.

15. A method according to claim 14, wherein statistics relating to the second geographic partial region are supplied in which, in the items of codec mode information transmitted in tandem free operation, the statistics relating to the second geographical partial region only rely on the items whose use is occasioned by transmission conditions in the second geographical partial region.

16. A method of monitoring transmission quality in a cellular radio communication system which supports different codec modes for radio transmission in each cell between a base station of the cell and a terminal device operating in the cell, the codec modes being combined into at least two codec mode sets, and the base station and the terminal device of a connection exchanging items of information concerning use of the codec modes, comprising:
   determining an extent of use of individual codec modes;
   collecting items of information in statistics respectively relating to a geographical partial region of the cellular radio communication system, including information about at least two codec mode sets; and
   evaluating the statistics for an extension of the cellular radio communication system.

17. A cellular radio communication system for communication with terminal devices, comprising:
   a plurality of base stations, each supporting different codec modes for radio transmission with the terminal devices operating in respective cells by exchanging control instructions to determine the codec mode to be used for a transmission at least one of from the terminal device to the base station and from the base station, the codec modes being combined into at least two codec mode sets, and each base station including
      a memory to receive records regarding use of each codec mode in a cell of the base station, and
      a processor to determine composition of a codec mode set for communication with each terminal device based on the records stored in the memory.

18. A cellular radio communication system according to claim 17, wherein the memory is established at one of a transcoder and rate adapter unit and a base station control allocated to one of the cells.

* * * * *

UNITED STATES PATENT AND TRADEMARK OFFICE
CERTIFICATE OF CORRECTION

PATENT NO. : 7,333,805 B2 Page 1 of 1
APPLICATION NO. : 10/239217
DATED : February 19, 2008
INVENTOR(S) : Stefan Oestreich It is certified that error appears in the above-identified patent and that said Letters Patent is hereby corrected as shown below:

Sheet 2 of 3, Fig. 2 (Drawings), Line 1, below graph Z1, change "Fig. 2" to --Fig. 2A--.

Sheet 2 of 3, Fig. 2 (Drawings), Line 1, below graph Z2, insert --Fig. 2B--.

Column 6, Line 5, change "BS1'1," to --BS1',--.

Column 6, Line 9, change "Z'1," to --Z1',--.

Column 8, Line 3, change "S'," to --S1',--.

Signed and Sealed this

Fifteenth Day of July, 2008

JON W. DUDAS
*Director of the United States Patent and Trademark Office*